US007304316B2

(12) United States Patent
Mair

(10) Patent No.: US 7,304,316 B2
(45) Date of Patent: Dec. 4, 2007

(54) STORAGE PHOSPHOR PLATE FOR THE STORAGE OF X-RAY INFORMATION AND A CORRESPONDING SYSTEM FOR READING OUT THE X-RAY INFORMATION

(75) Inventor: Stephan Mair, Weilheim (DE)

(73) Assignee: Agfa-Gevaert HealthCare GmbH, Leverkusen (DE)

( * ) Notice: Subject to any disclaimer, the term of this patent is extended or adjusted under 35 U.S.C. 154(b) by 67 days.

(21) Appl. No.: 11/259,983

(22) Filed: Oct. 27, 2005

(65) Prior Publication Data

US 2006/0091337 A1 May 4, 2006

(30) Foreign Application Priority Data

Oct. 29, 2004 (EP) .................................. 04105391

(51) Int. Cl.
*G03B 42/08* (2006.01)
*G21K 4/00* (2006.01)

(52) U.S. Cl. .................................................... 250/484.4

(58) Field of Classification Search .............. 250/484.4
See application file for complete search history.

(56) References Cited

U.S. PATENT DOCUMENTS

| | | | | |
|---|---|---|---|---|
| 4,806,757 | A | 2/1989 | Kano | |
| 4,999,505 | A * | 3/1991 | Gasper et al. | 250/484.4 |
| 5,464,568 | A * | 11/1995 | Bringley et al. | 252/301.4 H |
| 2002/0066868 | A1* | 6/2002 | Shoji et al. | 250/484.4 |
| 2003/0066973 | A1 | 4/2003 | Misawa et al. | |
| 2003/0209675 | A1* | 11/2003 | Maezawa et al. | 250/484.4 |

FOREIGN PATENT DOCUMENTS

| | | |
|---|---|---|
| EP | 0282088 | 9/1988 |
| EP | 0360116 | 3/1990 |
| JP | 2000304863 | 11/2000 |

* cited by examiner

*Primary Examiner*—David Porta
*Assistant Examiner*—Mindy Vu
(74) *Attorney, Agent, or Firm*—Houston Eliseeva LLP

(57) ABSTRACT

A storage phosphor plate for the storage of X-ray information, including a storage phosphor layer which stores the X-ray information and can be stimulated by stimulation light into emitting emission light, and a support layer on which the storage phosphor layer is located, the support layer being partially transparent for the stimulation light, and having a thickness d and an absorption coefficient for the stimulation light, where (k times d)≧0.2.

17 Claims, 2 Drawing Sheets

STORAGE PHOSPHOR PLATE FOR THE STORAGE OF X-RAY INFORMATION AND A CORRESPONDING SYSTEM FOR READING OUT THE X-RAY INFORMATION

The invention relates generally to a storage phosphor plate for the storage of X-ray information and a corresponding system or device for reading out the X-ray information. Furthermore, the invention relates to a corresponding radiography module or cassette for housing a system and storage phosphor plate for reading out the X-ray information.

BACKGROUND OF THE INVENTION

Generic storage phosphor plates and devices are used, in particular for medical purposes, in the field of computer radiography (CR). Here, X-rays are recorded in so-called storage phosphor layers, whereby the X-ray radiation passing through an object, for example a patient, is stored as a latent picture in the storage phosphor layer. In order to read out the stored picture, the storage phosphor layer is irradiated with stimulation light, and so stimulated into emitting emission light, the intensity of which is dependent upon the respectively stored picture information. The emission light is collected by an optical detector and converted into electric signals which can be further processed as required and shown on a monitor or on a corresponding display unit, such as eg. a printer.

In certain applications, the storage phosphor layer is applied to a support layer which is partially transparent for the stimulation light so that the storage phosphor layer can be stimulated by irradiating with stimulation light from the side of the support layer.

The problem can arise here that part of the stimulation light in the region of the upper boundary surface between the support layer and storage phosphor layer is reflected or dispersed back into the support layer by reflection and/or dispersion and reflected back in the direction of the storage phosphor layer on the lower boundary surface of the support layer. In such cases, in particular with support layers with a large thickness, regions of the storage phosphor layer are stimulated which are so far away from the region of the storage phosphor layer currently to be read out that the emission light emitted from them can no longer be collected. The consequence of this so-called advance read-out of individual regions is that with a subsequent, actual read-out of these regions, a reduced intensity of the emission light is obtained, and this leads overall to a detrimental effect upon the picture quality.

It is the objective of the invention to provide a storage phosphor plate and a corresponding device and a radiography module for reading out this type of storage phosphor plate with which an improved picture quality can be achieved.

SUMMARY OF THE INVENTION

The above and other problems in the prior art are solved by use of a storage phosphor plate for the storage of X-ray information, including a storage phosphor layer which stores the X-ray information and can be stimulated by stimulation light into emitting emission light, and a support layer on which the storage phosphor layer is located, the support layer being partially transparent for the stimulation light, and having a thickness d and an absorption coefficient k for the stimulation light, where (k times d)$\geqq$0.2.

Due to the combination of a specific thickness of the support layer with the absorption properties for stimulation light of the same according to the invention, an efficient weakening of the light beams of the stimulation light relevant to the advance read-out is achieved, and so the picture quality improved. In particular, with relatively large thicknesses of the support layer with which the effect of the advance read-out has a particularly unfavourable effect upon the picture quality, using a support material with relatively small absorption coefficients, the advance read-out can be prevented, or at least greatly reduced. By using this type of relatively weakly absorbent support materials, the costs of appropriate support materials can be substantially reduced.

In a preferred embodiment of the invention it is proposed that the thickness of the support layer comes within the range of between 1 mm and 10 mm. In this thickness range, the carrying capacity and mechanical stability of the support layer is sufficient for most applications. Any distortion of the storage phosphor layer positioned on the support layer is in this way sufficiently reduced so as to prevent any damage to the phosphor layer. The strongly pronounced effect of the advance read-out in this thickness range is prevented, or at least reduced, by the choice of the absorption coefficient of the support layer for stimulation light according to the invention.

Preferably, the storage phosphor plate is self-supporting. The thickness of the support layer is chosen here as regards its length/width ratio such that it can be held at the edges along with the storage phosphor layer positioned on top of it, without it becoming substantially distorted. In this way, any additional mechanically stabilising layers or supports can be dispensed with so that the storage phosphor layer can be irradiated, unimpeded, with stimulation light on its lower side, i.e. from the transparent support layer.

Preferably, the absorption coefficient of the support layer for the stimulation light is less than 1 $mm^{-1}$ and greater than 0.02 $mm^{-1}$. This makes it possible to use materials which require a relatively small degree of light weakening by absorption for the stimulation light, and are therefore correspondingly inexpensive.

In a particularly preferred embodiment of the invention, the support layer includes a colouring which can partially absorb the stimulation light. This can be achieved, for example, by selecting an appropriately coloured glass or synthetic material for the support layer. The colouring here can either be distributed evenly over the whole thickness of the support layer or be contained in at least a first partial layer of the support layer. With the latterly specified alternative, the support layer preferably has two layers, namely one layer which does not substantially absorb the stimulation light, and an additional layer of colouring which partially absorbs the stimulation light. The desired absorption coefficient of the support layer can then be achieved simply by an appropriate choice of coloured layer.

Preferably, the support layer has a lower and an upper boundary surface, the storage phosphor layer being located on the upper boundary surface and the at least one first partial layer being located in the region of the upper and/or lower boundary surface of the support layer. By locating the first partial layer in the region of the upper or lower boundary surface of the support layer, it is possible to particularly efficiently avoid or reduce the re-entry of dispersed radiation into the support layer or the reflection of the dispersed radiation on the lower boundary surface.

In one variation of the invention, it is proposed that the support layer can partially absorb the stimulation light dependent upon polarisation of the same. This variation is advantageous when using polarised stimulation light, such as laser light. The absorption properties of the support layer are chosen here such that the originally polarised stimulation layer can pass through the support layer without any loss, and can stimulate the storage phosphor light located on the same into emitting emission light. The stimulation light thus dispersed on the upper boundary surface of the support layer is, however, no longer polarised as it was originally due to the dispersion process, and is absorbed by the support layer so that advance read-out of the storage phosphor layer is reduced or prevented. The absorption coefficient for stimulation light in the sense of the invention identifies in this variation the absorption coefficient for that portion of the stimulation light which does not have a preferred polarisation direction, i.e. is polarised isotropically.

Preferably, the support layer has at least a second partial layer in which the stimulation light can be partially absorbed dependent upon polarisation of the same. The second partial layer is preferably located in the region of the lower boundary surface of the support layer. In this way, it is particularly easy to create a polarisation-dependent absorbent support layer.

It is also preferred that the storage phosphor layer comprises a large number of oblong, in particular needle-shaped storage phosphor particles. These so-called needle phosphors are characterised by a particularly high intensity of stimulated emission light and so by a particularly high picture quality. Corresponding storage phosphor plates are also called Needle Image Plates (NIP).

With the device according to the invention for reading out from the storage phosphor layer, the irradiation device for irradiating the storage phosphor layer with stimulation light is disposed on the side of the support layer facing away from the storage phosphor layer. The storage phosphor layer is therefore irradiated with stimulation light from the upper boundary surface of the support layer.

The detection device for collecting emission light is preferably disposed on the side of the support layer facing towards the storage phosphor layer. In this way it is possible to carry out an efficient read-out of the storage phosphor layer in transmission geometry. In this way, a particularly high picture quality is achieved, with at the same time a very compact device, in particular in connection with oblong, needle-shaped storage phosphor particles which act like small light conductors for the stimulation and/or emission light.

Further features and advantages of the invention are given in the following description of preferred embodiments and examples of applications, reference being made to the attached drawings, not necessarily drawn to scale.

DETAILED DESCRIPTION OF THE PREFERRED EMBODIMENTS

Figure 1:
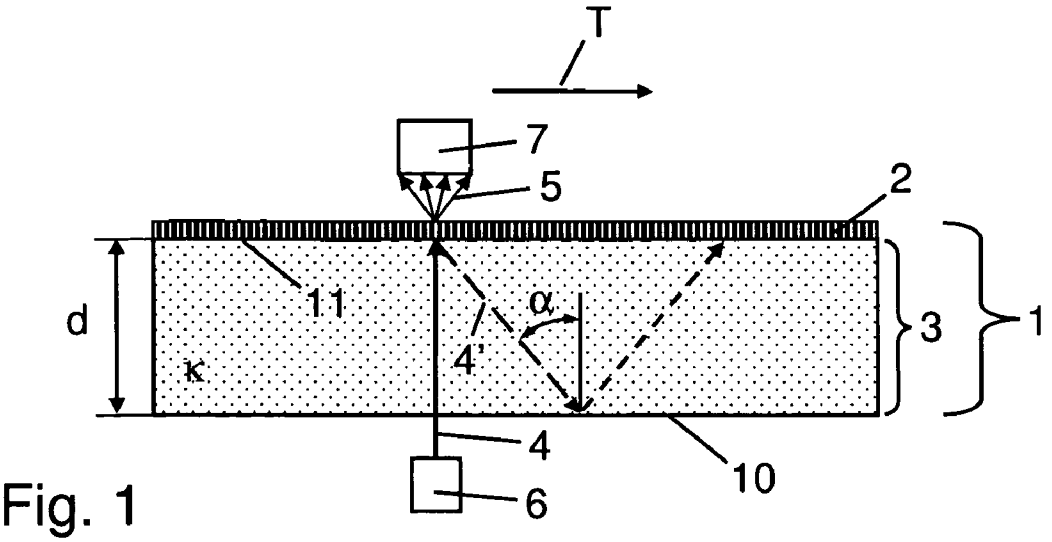
FIG. 1 shows a first example of an embodiment of the invention.

FIG. 1 shows a first example of an embodiment of the invention. The storage phosphor plate 1 includes a support layer 3 and a storage phosphor layer 2 located on top of the support layer. The storage phosphor layer 2 is preferably in the form of a so-called needle phosphor layer which includes a large number of oblong, in particular needle-shaped, storage phosphor particles.

An irradiation device 6, in particular a laser or a laser diode line, serves to irradiate the storage phosphor layer 2 with stimulation light 4 which can stimulate the storage phosphor layer 2 into emitting emission light 5, the intensity of which is dependent upon the X-ray information stored in the storage phosphor layer 2. The emission light 5 emitted is detected with a detection device 7, in particular a photomultiplier or a line detector. The irradiation device 6 and the detection device 7 are preferably combined in a reading head (scan head) which is moved over the storage phosphor plate 1 in conveyance direction T so that the X-ray information stored in the storage phosphor layer 2 is successively read out. Alternatively however, the reading head can also be fixed. In this case, the storage phosphor plate 1 is moved past the reading head.

The reading head is preferably in the form of a so-called line scanner, with which, at a particular point in time, one whole line of the storage phosphor layer 2 is respectively read out. In this case, the irradiation device 6 has a line light source, in particular in the form of laser diodes arranged in a line, and the detection device 7 includes a large number of light-sensitive detectors, in particular a photo diode or CCD array, arranged in a line.

The support layer 3 is partially transparent for the stimulation light 4 so that part of the stimulation light 4 entering into the support layer 3 finally strikes the lower side of the storage phosphor layer 2, and can be stimulated into emitting emission light 5. However, only part of the stimulation light 4 striking the storage phosphor layer 2 is absorbed. Other parts of the stimulation light 4 are reflected on the upper boundary surface 11 of the support layer 3 or are dispersed on the storage phosphor layer 2, and partially arrive back at the support layer 3. These portions are shown for example in FIG. 1 by means of a first light beam 4'.

The first light beam 4' strikes the lower boundary surface 10 of the support layer 3, is at least partially reflected back to the storage phosphor layer 2, and finally strikes the lower side of the storage phosphor layer 2 once again. In the region where the reflected stimulation light 4' strikes, the storage phosphor layer 2 is also stimulated into emitting emission light which, however, can not be collected by the detection device 7 due to the limited space of its aperture. The consequence of this so-called advance read-out is that the intensity of the emission light collected in a subsequent, actual read-out process in this region is lowered, and because of this, the quality of the X-ray picture read out is reduced.

In order to reduce or avoid advance read-out, the support layer 3 is designed in such a way that it has a specific absorption coefficient k for the stimulation light 4 and 4', and a specific thickness d, where the product of the thickness d and the absorption coefficient k is greater than or equal to 0.2, mathematically expressed as $(k \text{ times } d) \geqq 0.2$.

The typical thickness d preferably lies within the range of between 1 and 10 mm. The absorption coefficient k for the stimulation light preferably lies within the range of between 0.02 and 1 $mm^{-1}$, in particular between 0.02 and 0.4 $mm^{-1}$. The maximum intensity of the stimulation light typically lies within the range of between 620 nm and 700 nm, in particular approximately 680 nm.

With the above selected values for the thickness d and the absorption coefficient k, the first light beams 4' which strike the lower boundary surface 10 of the support layer 3 at an angle α, which is greater than or equal to the limit angle of the total reflection, are weakened so that advance read-out caused by these first light beams 4' is prevented. For a support layer 3 made from glass the limit angle of the total reflection is 41.8°.

In this first embodiment, the support layer 3 is in the form of a glass plate which includes colouring which partially absorbs the stimulation light 4 and 4'. The colouring is chosen here such that light can be absorbed either in broad bands or only in certain wavelength regions. Suitable absorbent glass materials can be obtained, for example, from the companies Saint Gobain Glass (eg. glass type SGG Parsol) or Schott (eg. glass type NG11).

Figure 2:
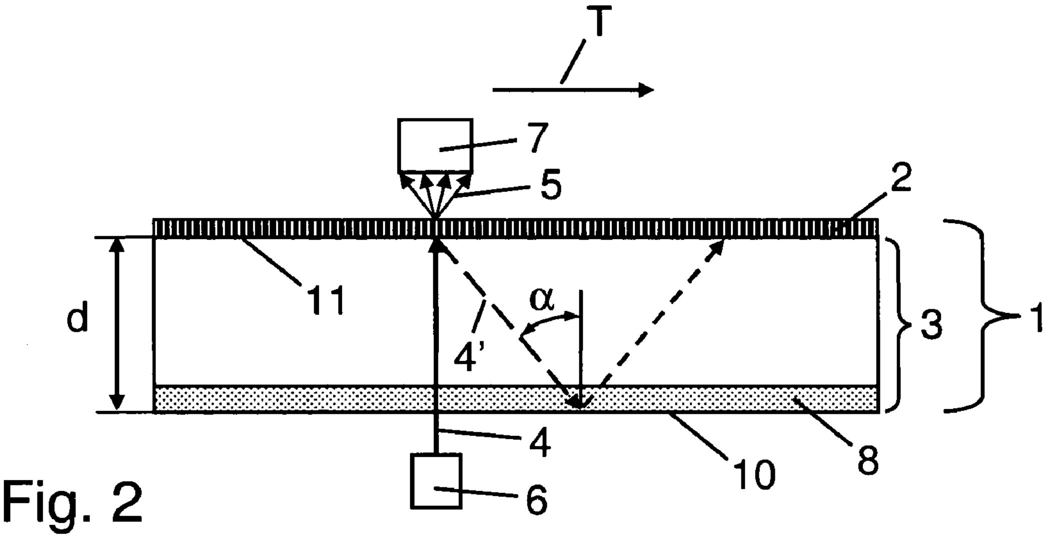
FIG. 2 shows a second example of an embodiment of the invention.

With the second embodiment shown in FIG. 2, the colouring which partially absorbs the stimulation light 4 is contained in a first partial layer 8 of the support layer 3. The effectiveness of this type of support layer 3 design in avoiding advance read-out is substantially identical here to the first embodiment shown in FIG. 1. In the second embodiment too the product of the thickness d of the support layer 3 and the absorption coefficient k of the support layer 3 for stimulation light 4 is greater than or equal to 0.2. The absorption coefficient k identifies here the absorption behaviour of the whole support layer 3, and not only that of the absorbent colouring layer in the first partial layer 8.

In this embodiment, the first partial layer 8 is located in the region of the lower boundary surface 10 of the support layer 3. Alternatively or in addition, the first support layer 8 can also be disposed in the region of the upper boundary surface 11 of the support layer 3.

With the examples shown in FIGS. 1 and 2, the stimulation light 4 required directly for the read-out of the storage phosphor layer 3 in addition to the stimulation light 4' reflected or dispersed on the upper boundary surface 11 is weakened by means of the absorbent support layer 3. In order to reduce or compensate this effect, the output of the irradiation device 6 and so also the intensity of the stimulation light 4 is correspondingly increased.

Figure 3:
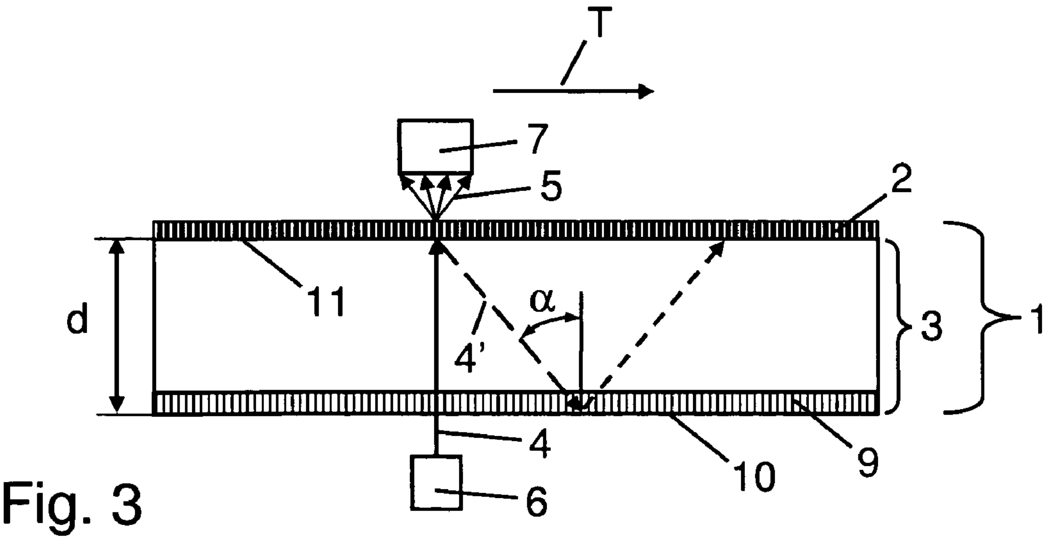
FIG. 3 shows a third example of an embodiment of the invention.

With the third embodiment shown in FIG. 3, the support layer 3 includes a second partial layer 9 which can absorb the stimulation light 4 dependent upon polarisation of the same. The stimulation light produced by the irradiation device 6, in particular a laser or a laser diode line is linearly polarised and can substantially pass the second partial layer 9 without any absorption loss. Due to the dispersion of part of the stimulation light 4 in the storage phosphor layer 2, the polarisation of the light beams 4' dispersed back into the support layer 3 is changed. The dispersed light is thus isotropically, i.e. direction-independently, polarised and as a result of this is absorbed to a large extent by the second partial layer 9 of the support layer 3. The dispersed stimulation light 4' striking the lower boundary surface 10 of the support layer 3 is in this way greatly weakened so that reflection on the lower boundary surface 10 and finally advance read-out of the storage phosphor layer 2 is prevented or at least greatly reduced.

In contrast with the examples of FIGS. 1 and 2, the third embodiment has the advantage that the linearly polarised stimulation light 4 can pass through the support layer 3 substantially without any loss of intensity, and because of this, the storage phosphor layer 2 can be stimulated with a high intensity without increasing the output of the irradiation device 6.

Alternatively or in addition, the second partial layer 9, which can absorb the stimulation light 4 or 4' dependent upon polarisation, is also disposed in the region of the upper boundary surface 11 of the support layer 3.

Figure 4:
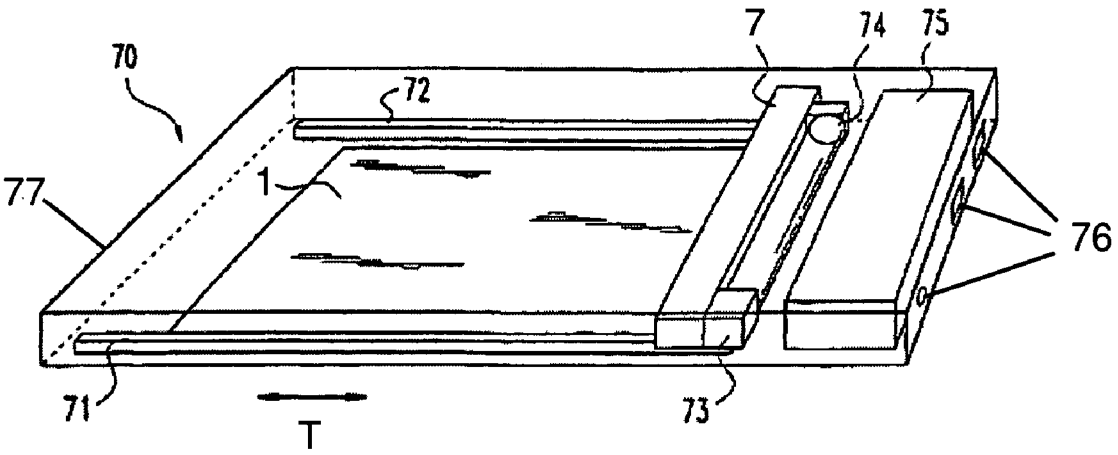
FIG. 4 shows a fourth example of an embodiment of the invention.

FIG. 4 shows a fourth embodiment of the system or device for reading out the X-ray information which is housed in a radiography module 70. The radiography module 70 is preferably in the form of and manipulated like an X-ray cassette. The module 70 is essentially portable and can be inserted or integrated into different X-ray systems, such as an X-ray stand or an X-ray table for taking X-ray images. In order to read out the X-ray image stored in the storage phosphor plate 1, the radiography module 70 can remain in the X-ray system and does not, as with a conventional X-ray cassette, have to be removed from the X-ray system and introduced into a separate read-out station.

The radiography module 70 includes a housing 77 in which the storage phosphor plate 1, the detection device 7 and the irradiation device are integrated. However in FIG. 4, the irradiation device 6 (see FIGS. 1 to 3) located on the lower side of the storage phosphor plate 1 is not visible.

With the radiography module 70 shown, the storage phosphor plate 1 is disposed in the housing 77 such that it is fixed, i.e. the storage phosphor plate 1 is securely connected to the housing 77 by means of appropriate connection elements. The connection to the housing 77 here can be fixed or swinging, for instance, using appropriate suspension elements in order to dampen any external impacts to the housing 77 and transfer of the same to the storage phosphor plate 1.

The reading head which includes the detection device 7 and the irradiation device (see description to FIG. 1 above) is movably mounted in the housing 77. In addition, in the region of the two long sides of the storage phosphor plate 1, guides 71 and 72 are disposed which serve as a mounting for the reading head, preferably in the form of an air bearing, and as guides. During read-out, the reading head is driven by an appropriate drive 73, such as a linear motor, and moved in conveyance direction T over the storage phosphor plate 1.

In addition to the reading head, a deletion lamp 74 is provided which is also driven by the drive 73 and can be moved over the storage phosphor plate 1 in order to delete any information remaining in the storage phosphor layer which could still be present after read-out.

Furthermore, a control device 75 is provided which controls or implements the read-out and deletion process as well as any signal processing processes. Interfaces 76 are provided on the control device 75 which are required for transferring energy, if required air pressure, control signals and/or image signals to or from the radiography module 70.

The invention claimed is:

1. A storage phosphor plate for storage of X-ray information, the phosphor plate comprising:

a storage phosphor layer which can store the X-ray information and be stimulated by stimulation light into emitting emission light, and a support layer on which the storage phosphor layer is positioned, the support layer being partially transparent for the stimulation light, and having a thickness d and an absorption coefficient k for the stimulation light, wherein (k times d)$\geqq$0.2 and absorption coefficient k for the stimulation light is greater than 0.02 $mm^{-1}$ and less than 1 $mm^{-1}$.

2. The storage phosphor plate according to claim 1, wherein the thickness d of the support layer is greater than 1 millimeter.

3. The storage phosphor plate according to claim 1, wherein the thickness d of the support layer is less than 10 millimeters.

4. The storage phosphor plate according to claim 1, wherein in that the storage phosphor plate is self-supporting.

5. The storage phosphor plate according to claim 1, wherein the support layer includes coloring which partially absorbs the stimulation light.

6. The storage phosphor plate according to claim 5, wherein the coloring is contained in at least one first partial layer of the support layer.

7. The storage phosphor plate according to claim 6, wherein the support layer has a lower and an upper boundary surface, the storage phosphor layer being located on the upper boundary surface, and the at least one first partial layer being located in a region of the upper and/or lower boundary surface of the support layer.

8. The storage phosphor plate according to claim 1, wherein the storage phosphor layer comprises a number of oblong storage phosphor particles.

9. A storage phosphor plate for storage of X-ray information, the phosphor plate comprising:

a storage phosphor layer which can store the X-ray information and be stimulated by stimulation light into emitting emission light, and a support layer on which the storage phosphor layer is positioned, the support layer being partially transparent for the stimulation light, and having a thickness d and an absorption coefficient k for the stimulation light, wherein (k times d)≧0.2 and the support layer partially absorbs the stimulation light dependent upon polarization of the stimulation light.

10. A storage phosphor plate for storage of X-ray information, the phosphor plate comprising:

a storage phosphor layer which can store the X-ray information and be stimulated by stimulation light into emitting emission light, and a support layer on which the storage phosphor layer is positioned, the support layer being partially transparent for the stimulation light, and having a thickness d and an absorption coefficient k for the stimulation light, wherein (k times d)≧0.2 and the support layer includes coloring that partially absorbs the stimulation light and the coloring is contained in at least one first partial layer of the support layer, and the support layer includes at least one second partial layer in which the stimulation light can be partially absorbed dependent upon polarization of the stimulation light.

11. The storage phosphor plate according to claim 10, wherein the support layer has a lower and an upper boundary surface, the storage phosphor layer being located on the upper boundary surface, and the second partial layer being located in a region of the lower boundary surface.

12. A system for reading out X-ray information stored in a storage phosphor layer, the system comprising:

an irradiation device for irradiating the storage phosphor layer with stimulation light which can stimulate the storage phosphor layer into emitting emission light;

a detection device for collecting emission light, which is emitted from the storage phosphor layer; and a storage phosphor plate for storage of the X-ray information in the storage phosphor layer, the phosphor plate comprising:

the storage phosphor layer which can store the X-ray information and be stimulated by the stimulation light into emitting the emission light, and a support layer on which the storage phosphor layer is positioned, the support layer being partially transparent for the stimulation light, and having a thickness d and an absorption coefficient k for the stimulation light, wherein (k times d)≧0.2 and absorption coefficient k for the stimulation light is greater than 0.02 $mm^{-1}$ and less than 1 $mm^{-1}$.

13. The system of claim 12 further comprising a radiography module housing, in particular in the form of an X-ray cassette, into which the system is integrated.

14. The system of according to claim 13, wherein, within the radiography module housing, the storage phosphor plate is fixed, and the irradiation device and the detection device are both movably mounted.

15. A system for reading out X-ray information stored in a storage phosphor layer, the system comprising:

an irradiation device for irradiating the storage phosphor layer with stimulation light which can stimulate the storage phosphor layer into emitting emission light;

a detection device for collecting emission light, which is emitted from the storage phosphor layer; and a storage phosphor plate for storage of the X-ray information in the storage phosphor layer, the phosphor plate comprising:

the storage phosphor layer which can store the X-ray information and be stimulated by the stimulation light into emitting the emission light, and a support layer on which the storage phosphor layer is positioned, the support layer being partially transparent for the stimulation light, and having a thickness d and an absorption coefficient k for the stimulation light, wherein (k times d)≧0.2;

wherein the irradiation device is disposed on a side of the support layer facing away from the storage phosphor layer.

16. A system for reading out X-ray information stored in a storage phosphor layer, the system comprising:

an irradiation device for irradiating the storage phosphor layer with stimulation light which can stimulate the storage phosphor layer into emitting emission light;

a detection device for collecting emission light, which is emitted from the storage phosphor layer; and a storage phosphor plate for storage of the X-ray information in the storage phosphor layer, the phosphor plate comprising:

the storage phosphor layer which can store the X-ray information and be stimulated by the stimulation light into emitting the emission light, and a support layer on which the storage phosphor layer is positioned, the support layer being partially transparent for the stimulation light, and having a thickness d and an absorption coefficient k for the stimulation light, wherein (k times d)≧0.2;

wherein the detection device is disposed on a side of the support layer facing the storage phosphor layer.

17. A system for reading out X-ray information stored in a storage phosphor layer, the system comprising:

an irradiation device for irradiating the storage phosphor layer with stimulation light which can stimulate the storage phosphor layer into emitting emission light;

a detection device for collecting emission light, which is emitted from the storage phosphor layer; and a storage phosphor plate for storage of the X-ray information in the storage phosphor layer, the phosphor plate comprising:

the storage phosphor layer which can store the X-ray information and be stimulated by the stimulation light into emitting the emission light, and a support layer on which the storage phosphor layer is positioned, the support layer being partially transparent for the stimulation light, and having a thickness d and an absorption coefficient k for the stimulation light, wherein (k times d)$\geqq$0.2;

wherein the irradiation device produces linearly polarized stimulation light.

* * * * *

UNITED STATES PATENT AND TRADEMARK OFFICE

CERTIFICATE OF CORRECTION

PATENT NO. : 7,304,316 B2
APPLICATION NO. : 11/259983
DATED : December 4, 2007
INVENTOR(S) : Mair It is certified that error appears in the above-identified patent and that said Letters Patent is hereby corrected as shown below:

On the Title page of the patent at (57) Abstract, line 7, after "coefficient", insert --k--.

In Claim 4, column 7, line 9, delete "in that".

Signed and Sealed this

Thirteenth Day of May, 2008

JON W. DUDAS
*Director of the United States Patent and Trademark Office*